US009092025B2

(12) United States Patent
Maekawa

(10) Patent No.: US 9,092,025 B2
(45) Date of Patent: Jul. 28, 2015

(54) THERMAL DISPLACEMENT COMPENSATING DEVICE FOR MACHINE TOOL

(71) Applicant: FANUC CORPORATION, Yamanashi (JP)

(72) Inventor: Susumu Maekawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 443 days.

(21) Appl. No.: 13/671,952

(22) Filed: Nov. 8, 2012

(65) Prior Publication Data

US 2013/0190921 A1 Jul. 25, 2013

(30) Foreign Application Priority Data

Jan. 19, 2012 (JP) .................................. 2012-009241

(51) Int. Cl.
G05D 19/00 (2006.01)
G05B 19/404 (2006.01)
B23Q 11/00 (2006.01)

(52) U.S. Cl.
CPC .......... *G05B 19/404* (2013.01); *B23Q 11/0007* (2013.01); *G05B 2219/49204* (2013.01)

(58) Field of Classification Search
CPC ................... G05B 19/404; G05B 2219/49204; B23Q 11/0007
USPC ................................................ 700/177–179
See application file for complete search history.

(56) References Cited

U.S. PATENT DOCUMENTS

| 4,919,575 | A | * | 4/1990 | Yoshimi et al. ................ 409/231 |
| 4,928,019 | A | * | 5/1990 | Tomikawa et al. ......... 250/559.3 |
| 5,513,113 | A | * | 4/1996 | Okada et al. .................. 700/179 |

(Continued)

FOREIGN PATENT DOCUMENTS

| CN | 1126130 A | 7/1996 |
| CN | 101151122 A | 3/2008 |

(Continued)

OTHER PUBLICATIONS

Chen et al.,"A Real-time Measurement Method of Temperature Fields and Thermal Errors in Machine Tools", IEEE, pp. 100-103.*

(Continued)

*Primary Examiner* — Robert Fennema
*Assistant Examiner* — Thomas Stevens
(74) *Attorney, Agent, or Firm* — Lowe Hauptman & Ham, LLP

(57) ABSTRACT

A thermal displacement compensating device calculates a thermal displacement amount which is produced by heat generation or dissipation as a machine tool is actuated or stopped and changes with time. A thermal displacement compensation amount is calculated by multiplying the calculated thermal displacement amount by a coefficient. A position command is compensated by adding the thermal displacement compensation amount to the position command. On the other hand, a variation between a thermal displacement amount calculated last time and a current thermal displacement amount is determined for each predetermined time. A plurality of thermal displacement amount change states are identified based on comparison between the determined variation and a predetermined threshold. The coefficient is calculated based on the identified thermal displacement amount change state.

2 Claims, 7 Drawing Sheets

(56) References Cited

U.S. PATENT DOCUMENTS

| | | | |
|---|---|---|---|
| 5,551,814 A * | 9/1996 | Hazama | 409/200 |
| 5,623,857 A | 4/1997 | Sakuraba | |
| 5,795,112 A | 8/1998 | Senda | |
| 5,895,181 A * | 4/1999 | Ito et al. | 409/132 |
| 6,471,451 B2 * | 10/2002 | Kojima et al. | 409/131 |
| 7,245,983 B2 * | 7/2007 | Suzuki et al. | 700/177 |
| 2002/0004688 A1 | 1/2002 | Kojima et al. | |
| 2002/0038189 A1 * | 3/2002 | Mizuguchi et al. | 702/94 |
| 2007/0105697 A1 * | 5/2007 | Iefuji | 483/1 |
| 2008/0136402 A1 * | 6/2008 | Sato | 324/105 |
| 2009/0037017 A1 * | 2/2009 | Besuchet et al. | 700/193 |

FOREIGN PATENT DOCUMENTS

| | | | |
|---|---|---|---|
| JP | 05116053 A | 5/1993 | |
| JP | 9-85581 A | 3/1997 | |
| JP | 2002018677 A | 1/2002 | |
| JP | 2003245844 A | 9/2003 | |

OTHER PUBLICATIONS

Japanese Office Action with English translation dated Apr. 16, 2013 (4 pages).

Office Action mailed Jan. 23, 2015, corresponding to Chinese patent application No. 201310020320.9, 14 pages.

* cited by examiner

THERMAL DISPLACEMENT COMPENSATING DEVICE FOR MACHINE TOOL

RELATED APPLICATIONS

The present application claims priority from, Japanese Application No. 2012-009241 filed Jan. 19, 2012, the disclosure of which is hereby incorporated by reference herein in its entirety.

BACKGROUND OF THE INVENTION

1. Field of the Invention

The present invention relates to a thermal displacement compensating device for a machine tool, and more particularly, to a device configured to adjust a thermal displacement compensation amount based on a compensation error in response to a thermal displacement change state, thereby precisely compensating thermal displacement.

2. Description of the Related Art

In a machine tool, a feed screw and a spindle are driven by a motor, so that they are expanded to displace the machine position by heat from the motor, frictional heat produced by the rotation of a bearing, and frictional heat from an engagement portion of the feed screw between a ball screw and a ball nut. Thus, the relative positions of a workpiece to be positioned and a tool are shifted. The displacement of the machine position due to the heat causes a problem in performing high-precision machining.

The displacement of the machine position due to heat is conventionally removed by a technique in which thermal displacement is easily compensated at low cost without using a temperature sensor, a technique in which a command position is compensated based on displacement or temperature detected by a displacement or temperature sensor, or a structure that applies initial tension to a feed screw and is not affected by thermal expansion.

A technique disclosed in Japanese Patent Application Laid-Open No. 2002-18677 is characterized in that thermal displacement can be easily compensated at low cost without using a sensor. The position of a feed shaft is detected, and an average movement speed is determined by the detected position. Based on this, an amount of thermal displacement due to heat generation, heat dissipation, and heat conduction from adjacent sections of the entire stroke of the feed shaft is estimated for each section, and the thermal displacement amounts for the individual sections from a reference point to a compensation position are added up. In this way, the distribution of thermal displacement in each position of a feed screw can be estimated, so that the thermal displacement can be precisely compensated in any position. Further, the thermal displacement can also be precisely compensated in consideration of thermal displacement due to heat generated by the rotation of a spindle or spindle motor, as well as of the feed shaft. Furthermore, more accurate compensation can be performed by compensating a heat-generation coefficient in a thermal displacement amount calculation formula, based on an amount of deviation (compensation error) between an estimated thermal displacement amount (compensation amount) and an actual machine position.

Further, Japanese Patent Application Laid-Open No. 9-85581 discloses a technique in which a temperature sensor is used and a method of estimating the thermal displacement of a spindle is varied depending on states, that is, a steady state at a saturated temperature and a transient state after a change of the spindle speed, based on a temperature detected by the temperature sensor.

If the machine tool is actuated, the spindle and the feed shaft are drastically elongated by an increase in temperature due to heat generation. As heat generation and dissipation are balanced thereafter, the rate of elongation is decreased and becomes substantially constant. If the drive is stopped or slowed down, in contrast, the shafts contract due to heat dissipation. Thus, the change of the thermal displacement amount of the machine tool can be classified into the following three states (see FIG. 1):

(1) a heat generating state in which the thermal displacement amount increases due to heat generation, (2) a steady state in which heat generation and dissipation are balanced so that the thermal displacement amount is substantially fixed, and (3) a heat dissipating state in which the thermal displacement amount decreases due to heat dissipation.

Japanese Patent Application Laid-Open No. 2002-18677 described above discloses a method of correcting the heat-generation coefficient in the thermal displacement amount calculation formula based on the correction error. Since the calculation formula includes additional coefficients (a heat-dissipation coefficient and a heat conduction coefficient for calculating heat conduction from adjacent sections), the precision of the correction may not be able to be satisfactorily improved by only modifying the heat-generation coefficient, in some cases. While the coefficient is modified without regard to the state (heat generating state, steady state, or heat dissipating state), moreover, the correction error is not always substantially constant irrespective of the state. As shown in FIG. 2, for example, an actual thermal displacement amount is substantially equal to a calculated thermal displacement amount in the steady state. In the heat generating or dissipating state, however, there may be some difference between the actual and calculated thermal displacement amounts. According to Japanese Patent Application Laid-Open No. 2002-18677, in such a case, however, proper correction cannot always be achieved in a state without the occurrence of a compensation error.

Further, the technique disclosed in Japanese Patent Application Laid-Open No. 9-85581 is intended to change the method of estimating thermal displacement depending on the state, whether steady or transient, thereby accurately compensating the thermal displacement despite the change of operating conditions. However, the transient state involves a case (heat generating state) where the thermal displacement increases and a case (heat dissipating state) where the thermal displacement decreases, and the thermal displacement does not always change to the same degree in these two states. A compensation error occurs if the thermal displacement changes differently. A method of overcoming the occurrence of the compensation error is not disclosed in the above patent document. Further, the use of the sensor causes a problem of an increase in cost and requires protection against a coolant, chips, etc., to ensure reliability.

SUMMARY OF THE INVENTION

Accordingly, in consideration of the above problems of the prior art, the object of the present invention is to provide a thermal displacement compensating device for a machine tool, capable of properly adjusting a thermal displacement compensation amount in any of states including a heat generating state, steady state, and heat dissipating state, thereby precisely compensating thermal displacement.

A thermal displacement compensating device for a machine tool according to the present invention comprises a thermal displacement amount calculation unit configured to calculate a thermal displacement amount which is produced by heat generation or dissipation as the machine tool is actuated or stopped and changes with time, a thermal displacement compensation amount calculation unit configured to calculate a thermal displacement compensation amount by multiplying the thermal displacement amount calculated by the thermal displacement amount calculation unit by a coefficient, a position command compensation unit configured to compensate a position command for a feed shaft by adding the thermal displacement compensation amount to the position command, a thermal displacement state identification unit configured to determine a variation between a thermal displacement amount calculated last time and a current thermal displacement amount for each first predetermined time by means of the thermal displacement amount calculation unit and identifying a plurality of thermal displacement amount change states based on comparison between the determined variation and a predetermined threshold, and a coefficient calculation unit configured to calculate the coefficient based on the thermal displacement amount change state identified by the thermal displacement state identification unit.

The thermal displacement compensating device for a machine tool may further comprise a thermal displacement compensation amount history unit configured to store the thermal displacement compensation amount calculated by the thermal displacement compensation amount calculation unit, time at calculation of the thermal displacement compensation amount, and the thermal displacement amount change state identified by the thermal displacement state identification unit into a memory for each second predetermined time, a thermal displacement compensation amount time variation display unit configured to graphically display a temporal variation in the thermal displacement compensation amount on a screen of the machine tool, based on the thermal displacement compensation amount stored in the memory by the thermal displacement compensation amount history unit and the time at calculation of the thermal displacement compensation amount, and a predicted thermal displacement compensation amount display unit configured to display a predicted thermal displacement compensation amount, which is calculated by applying a coefficient determined by the coefficient calculation unit to the thermal displacement compensation amount stored in the memory, on a graph displayed by the thermal displacement compensation amount time variation display unit.

According to the present invention, there may be provided a thermal displacement compensating device for a machine tool, capable of properly adjusting a thermal displacement compensation amount in any of states including a heat generating state, steady state, and heat dissipating state, thereby precisely compensating thermal displacement. In the thermal displacement compensating device of the invention, the thermal displacement state identification unit can identify the thermal displacement amount change state, and the coefficient calculation unit and the thermal displacement amount calculation unit can adjust the thermal displacement compensation amount based on the identified state. Thus, proper compensation can be performed according to the individual states. Further, the thermal displacement state identification unit determines the variation of the thermal displacement amount calculated by the thermal displacement amount calculation unit and identifies the plurality of thermal displacement amount change states based on the determined variation. Accordingly, there is no need of a sensor for identifying the thermal displacement amount change state, so that no additional cost is required for sensor means. Thus, the precision of the thermal displacement compensation can be reliably increased at low cost without the necessity of protecting the sensor means against a coolant, chips, etc., to ensure reliability.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
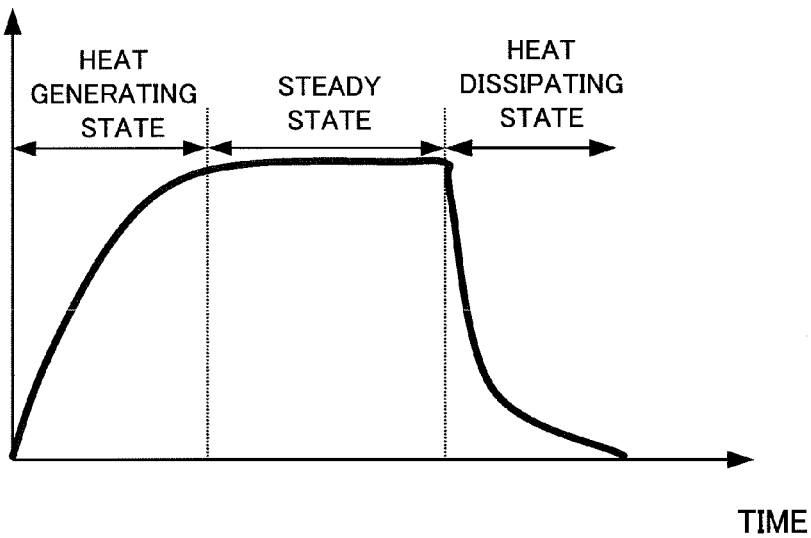
FIG. 1 is a graph illustrating temporal variation in a thermal displacement amount.
Figure 2:
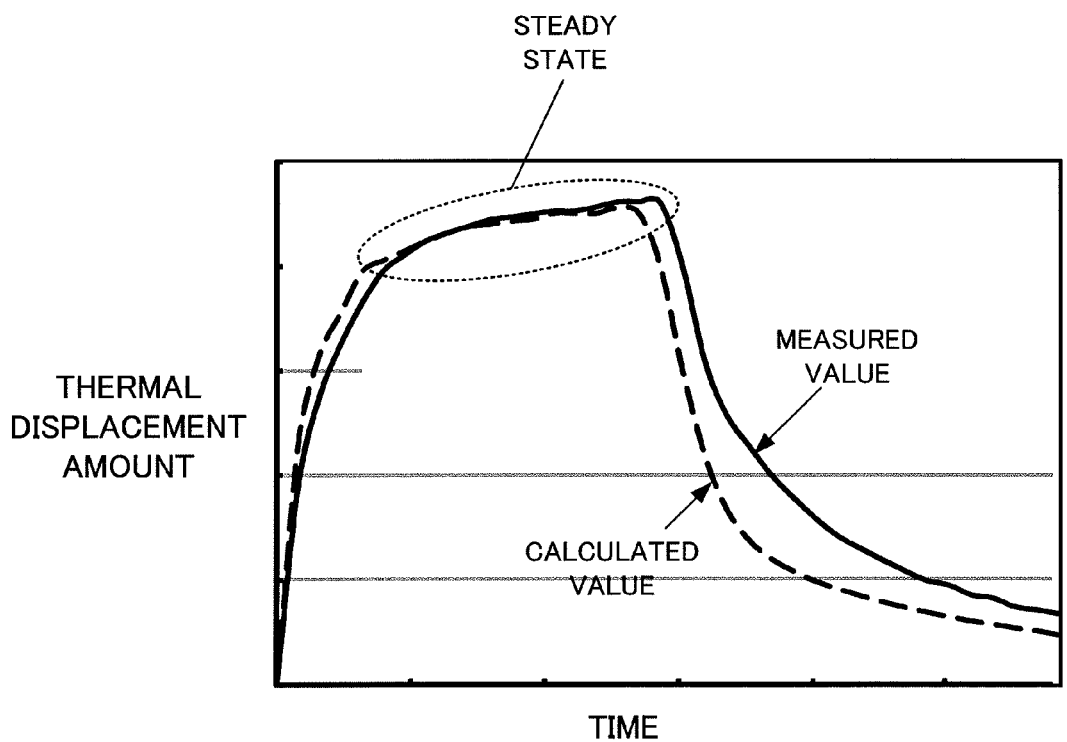
FIG. 2 is a graph illustrating temporal variation in measured and calculated values of the thermal displacement amount.
Figure 3:
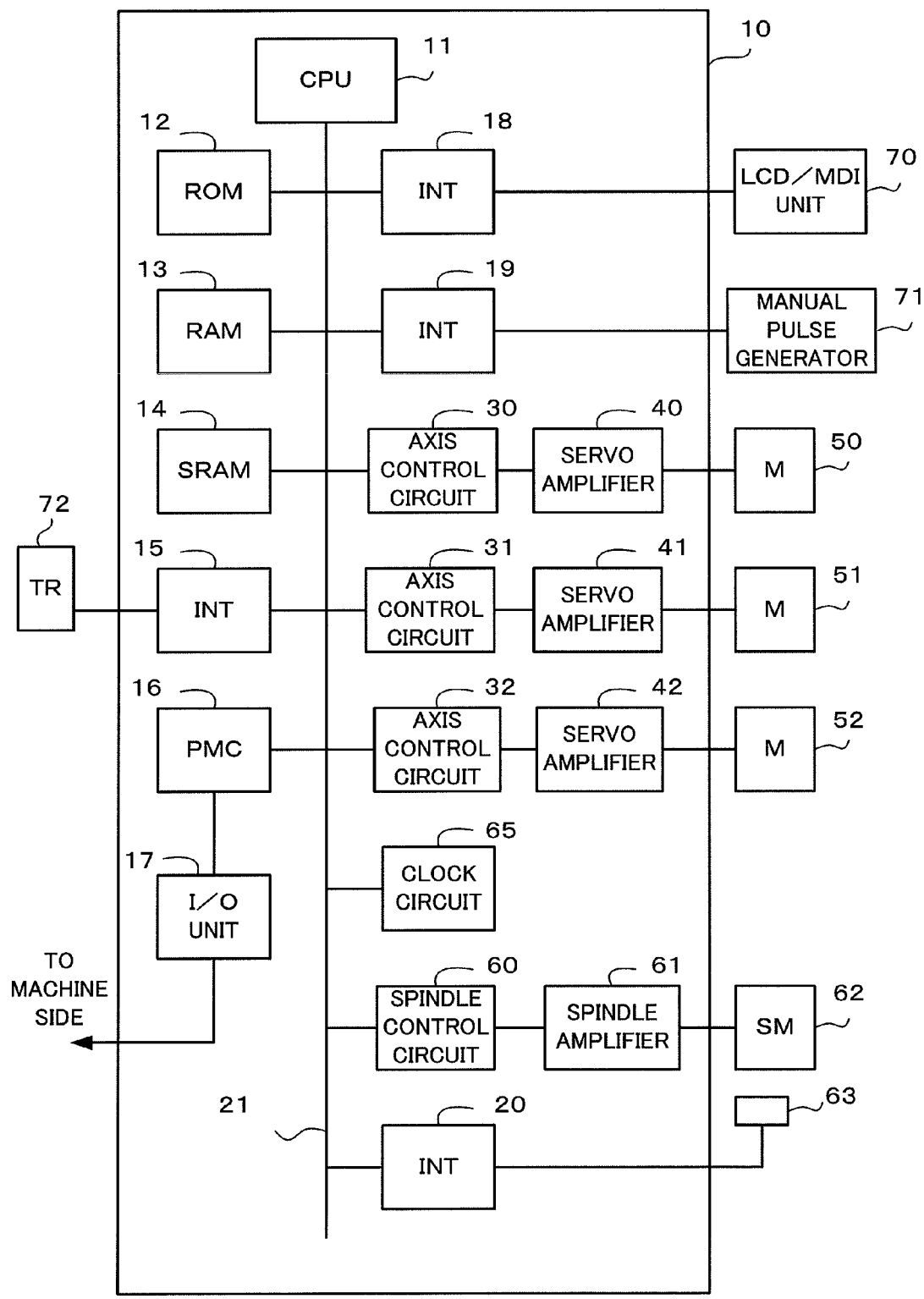
FIG. 3 is a block diagram illustrating a numerical controller for controlling a machine tool.

FIG. 3 is a functional block diagram showing a principal part of a numerical controller for a machine tool.

A processor (CPU) 11 of a numerical controller 10 reads a system program stored in a ROM 12 through a bus 21 and generally controls the numerical controller 10 according to the system program. A RAM 13 is loaded with temporary calculation data and display data, various data input by an operator through an LCD/MDI unit 70, etc.

An SRAM 14 is a nonvolatile memory that is backed up by a battery (not shown) such that it can maintain its memory state even when the numerical controller 10 is switched off. The SRAM 14 can be stored with a program for the measurement of an initial position, a program for thermal displacement compensation of the machine tool, a machining program (described later) read through an interface 15, a machining program input through the LCD/MDI unit 70, etc. Further, the ROM 12 is preloaded with various system programs for the execution of edit mode processing required for the creation and editing of the machining programs and processing for automatic operation.

The interface 15 serves for external equipment connectable to the numerical controller 10 and is connected with an external device 72, such as an external storage device. The machining programs, thermal displacement measurement program, etc., are read from the external storage device. A programmable machine controller (PMC) 16 controls auxiliary devices or the like on the machine tool side according to sequential programs in the numerical controller 10. Specifically, necessary signals on the auxiliary device side are converted according to these sequential programs, based on M-, S-, and T-functions commanded by the machining program. The converted signals are output to the auxiliary device side through an input-output unit 17. The auxiliary devices, e.g., various actuators, are activated by these output signals. When signals are received from various switches of a control panel on the main body of the machine tool, moreover, they are processed as required and delivered to the processor 11.

Image signals representative of the respective current positions of the individual axes of the machine tool, alarms, parameters, image data, etc., are transmitted to the LCD/MDI unit 70 and displayed on its display. The LCD/MDI unit 70 is a manual data input device provided with the display, a keyboard, etc. An interface 18 receives data from the keyboard of the LCD/MDI unit 70 and delivers it to the processor 11.

An interface 19 is connected to a manual pulse generator 71. The manual pulse generator 71 is mounted on the control panel of the machine tool and used to precisely position moving parts of the machine tool by control of individual axes with distributed pulses based on manual operation.

X- and Y-axis control circuits 30 and 31 for moving a table of the machine tool and a Z-axis control circuit 32 receive move commands for the individual axes from the processor 11 and output the commands to servo amplifiers 40 to 42. On receiving these commands, the servo amplifiers 40 to 42 drive servomotors 50 to 52 for the individual axes of the machine tool, respectively. Encoders for position detection are incorporated individually in the servomotors 50 to 52. Position signals from these encoders are fed back as pulse trains.

A spindle control circuit 60 receives a spindle rotation command for the machine tool and outputs a spindle speed signal to a spindle amplifier 61. On receiving this spindle speed signal, the spindle amplifier 61 rotates a spindle motor 62 of the machine tool at a commanded rotational speed, thereby driving a tool.

A position detector 63 is coupled to the spindle motor 62 by gears, a belt, or the like. The position detector 63 outputs feedback pulses in synchronism with the rotation of a spindle, and the feedback pulses are read through an interface 20 by the processor 11. Reference numeral 65 denotes a clock circuit adjusted so as to synchronize with the current time.

Calculation (or estimation) and compensation of a thermal displacement amount will first be described with reference to FIG. 4.

Figure 4:
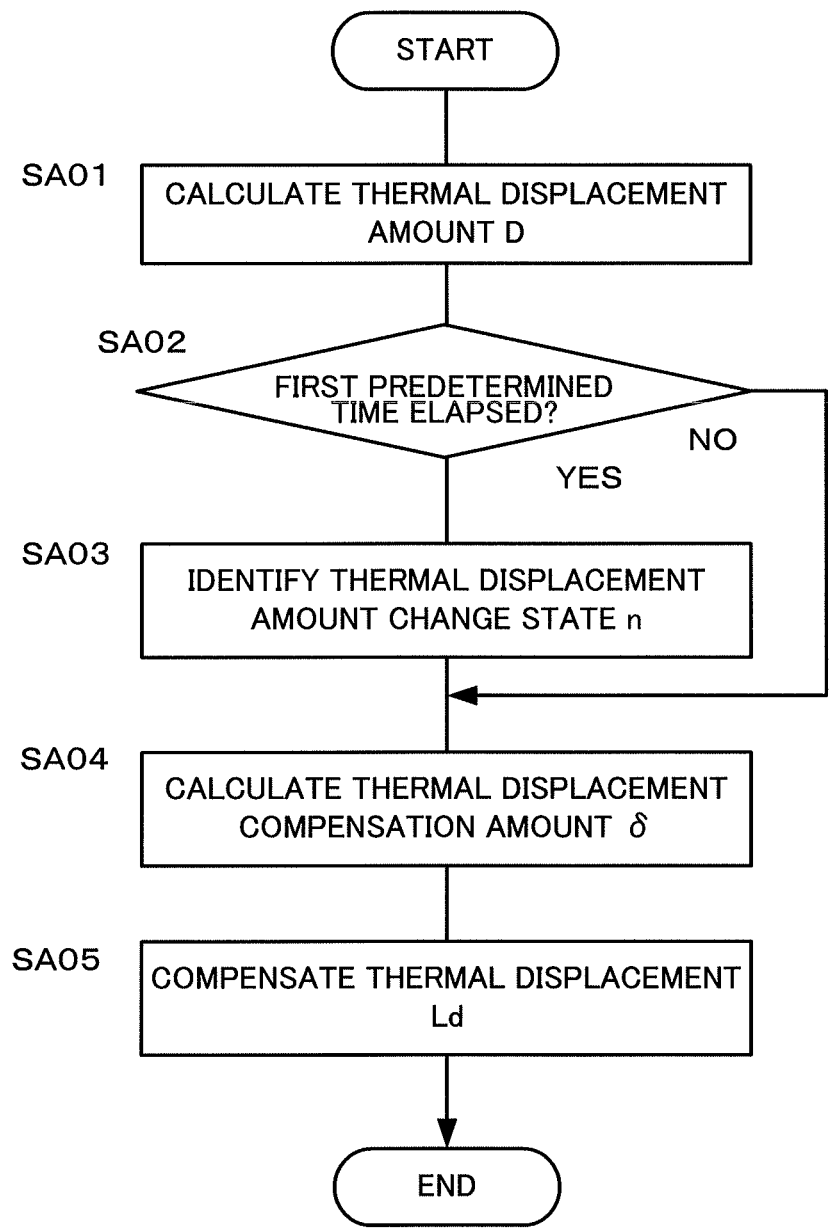
FIG. 4 is a flowchart showing processing for calculation (or estimation) and compensation of the thermal displacement amount.

<Calculation of Thermal Displacement Amount> (see Step SA01 of FIG. 4)

A thermal displacement amount D of a feed shaft is calculated by a method similar to, for example, that disclosed in Japanese Patent Application Laid-Open No. 2002-18677. The calculation method for the thermal displacement amount D is not limited to this and may alternatively be based on the measurement of temperatures and positions at various parts of the feed shaft.

Figure 5:
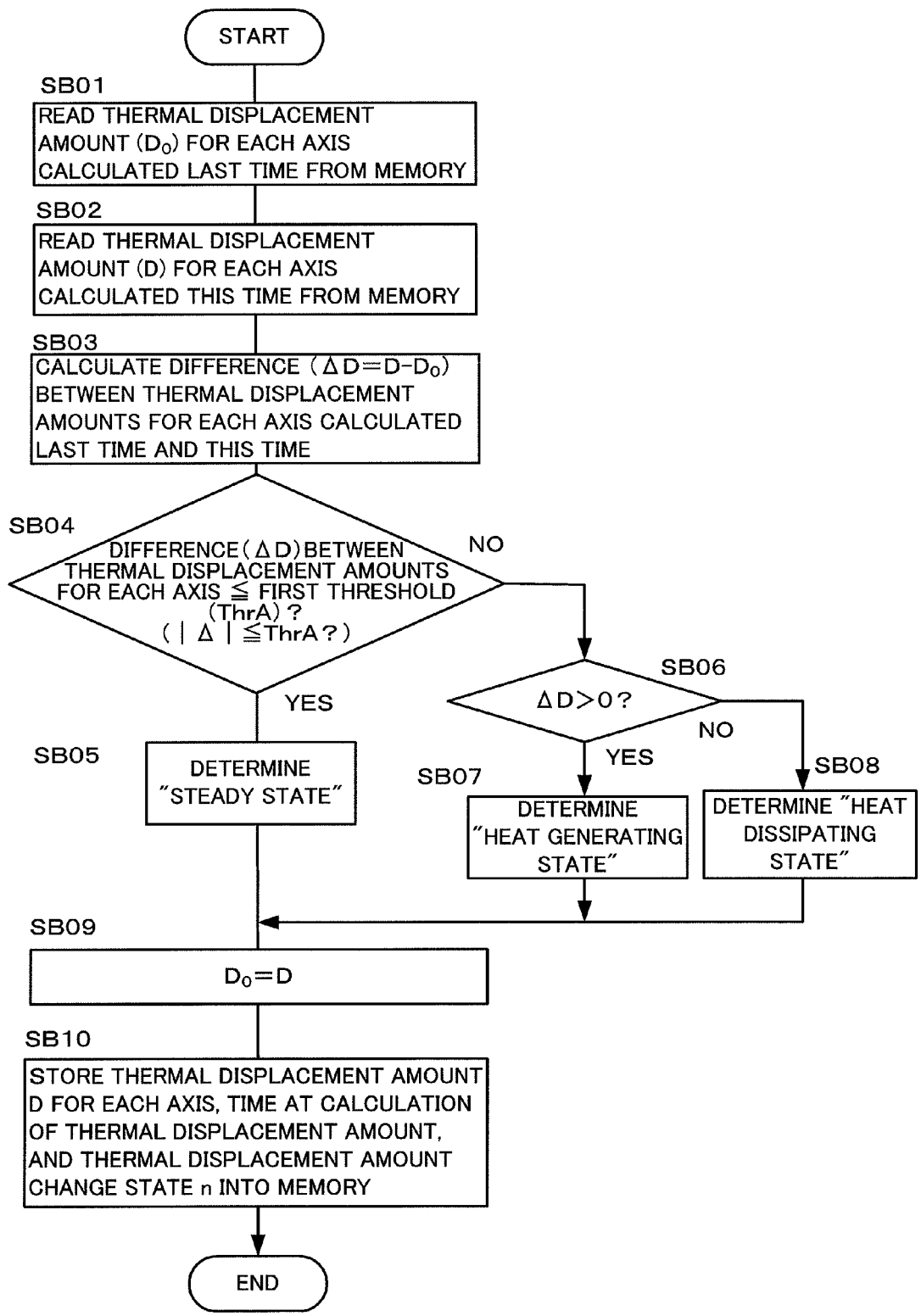
FIG. 5 is a flowchart showing processing for identifying a thermal displacement amount change state.

<Identification of Thermal Displacement Amount Change State> (see FIG. 5 and Step SA03 of FIG. 4)

A thermal displacement amount change state n is identified for each first predetermined time (see Step SA02 of FIG. 4), based on the calculated thermal displacement amount D for each axis. First, a variation ΔD (difference between a thermal displacement amount calculated last time and that calculated this time) of the thermal displacement amount D is calculated for each axis. If the variation ΔD of the thermal displacement amount is not higher than a predetermined threshold, a steady state is identified. If the variation ΔD is higher than the predetermined threshold and if the thermal displacement amount D is found to be increased, a heat generating state is identified. A heat dissipating state is identified in other cases. Alternatively, the variation AD of the thermal displacement amount D for any one of the axes may be calculated instead of calculating those for all the axes so that it can be used in common for all the axes.

Figure 6:
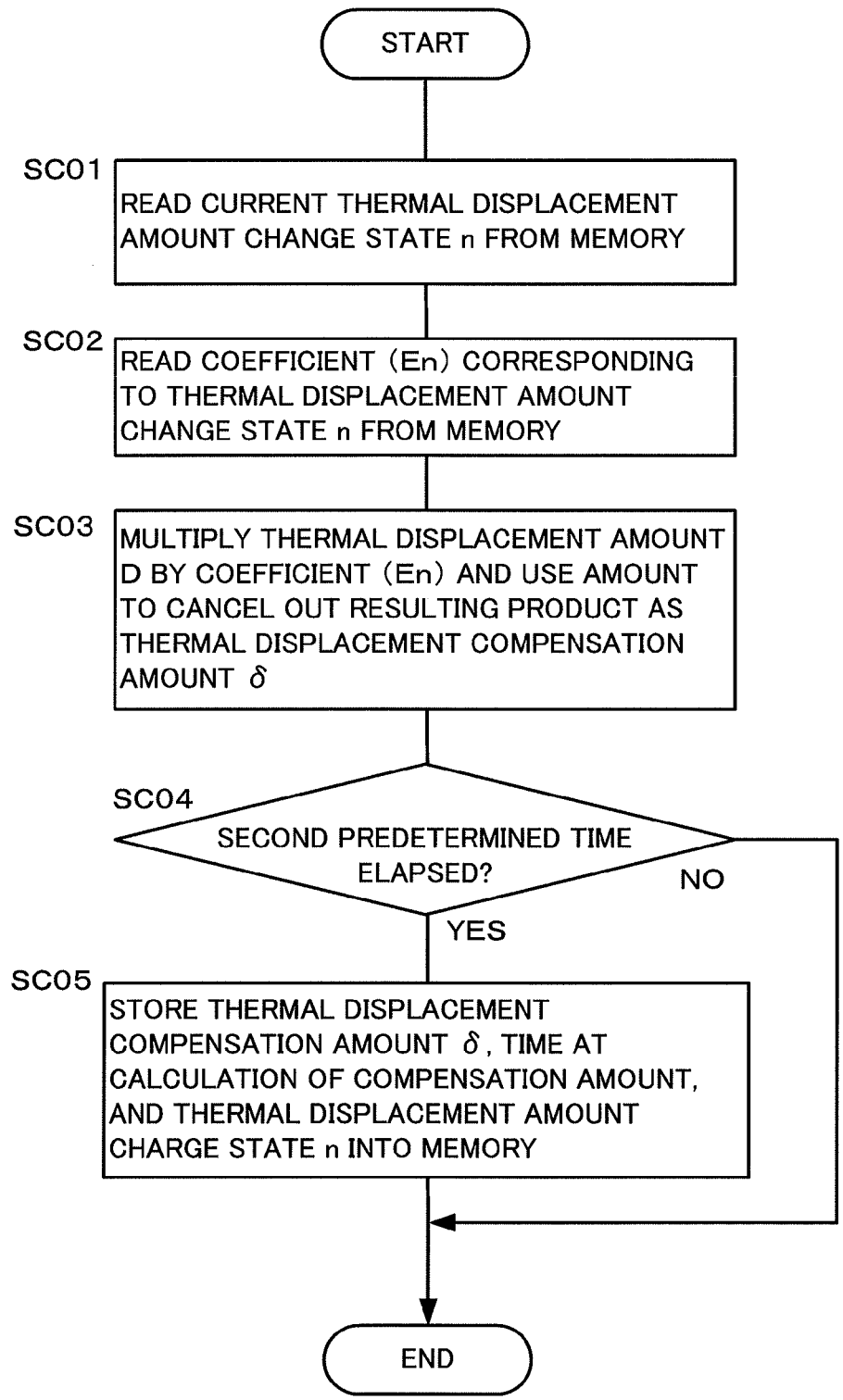
FIG. 6 is a flowchart showing processing for calculating a thermal displacement compensation amount.

<Calculation of Thermal Displacement Compensation amount> (see FIG. 6 and Step SA04 of FIG. 4)

The calculated thermal displacement amount D is multiplied by a coefficient En (see 3.2, described later) corresponding to the thermal displacement amount change state n, and an amount to cancel out the resulting product is calculated as a thermal displacement compensation amount δ for each axis. The calculated thermal displacement compensation amount δ for each axis, along with the time at calculation and the thermal displacement amount change state n, is stored into a memory for each predetermined time.

<Compensation of Thermal Displacement> (see Step SA05 of FIG. 4)

A thermal displacement Ld is compensated by a conventional method. As shown in Japanese Patent Application Laid-Open No. 2002-18677 described before, for example, compensation is performed by adding the thermal displacement compensation amount δ to a position command for the feed shaft. The compensation may be performed by another method in which a coordinate system is shifted, for example.

Figure 7:
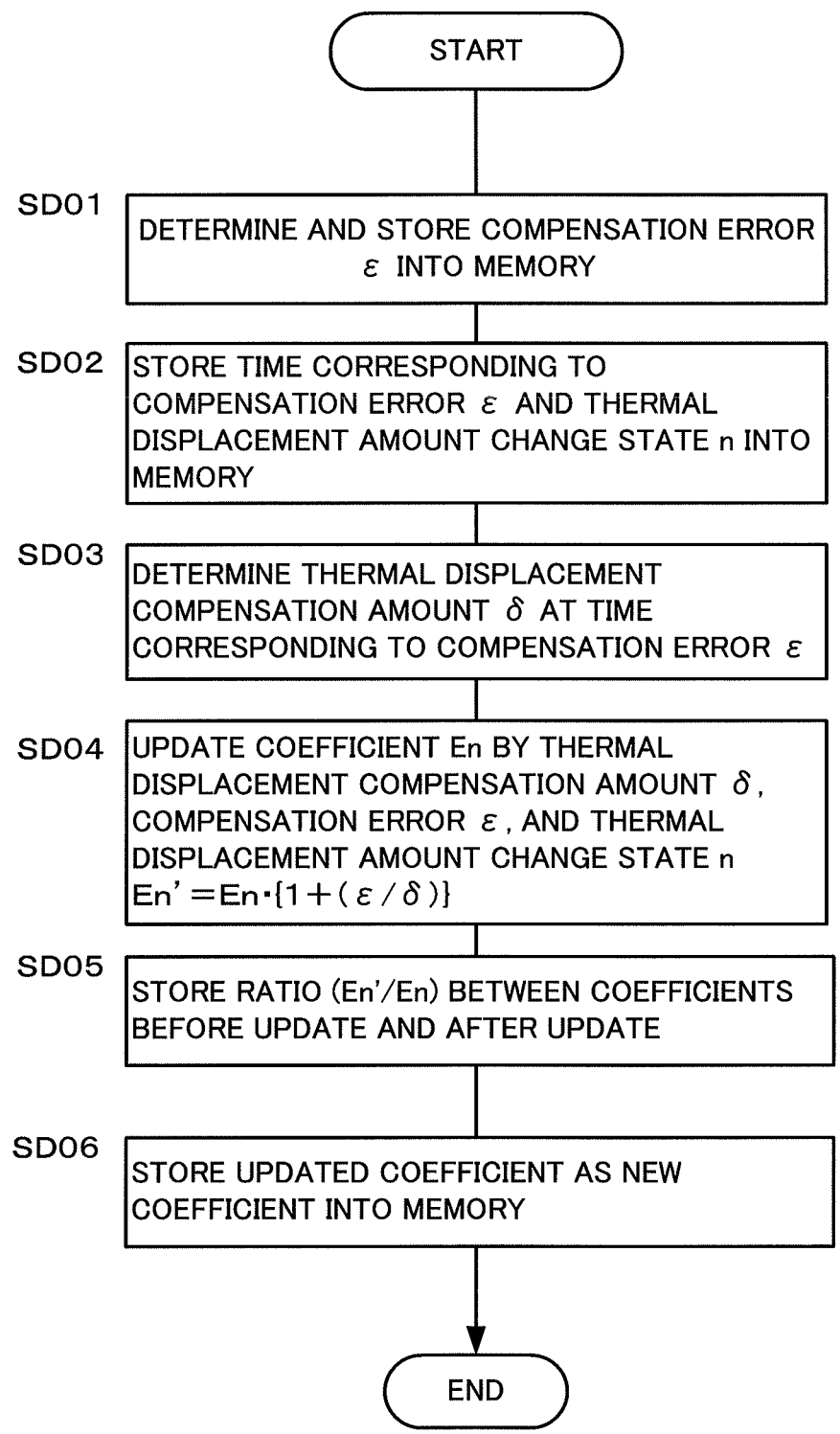
FIG. 7 is a flowchart showing processing for calculating a coefficient.

A method of calculating the coefficient (corresponding to the thermal displacement amount change state) used in calculating the thermal displacement compensation amount will now be described with reference to FIG. 7.

<Measurement of Compensation Error>

A compensation error E in the direction of each axis is determined by measuring (1) a predetermined spot on the machine or (2) a predetermined position of a workpiece which was machined with the thermal displacement Ld compensated.

In the case (1) where the compensation error E in the direction of each axis is determined by measuring the predetermined spot on the machine with the thermal displacement Ld compensated, the compensation error ε obtained from the result of the measurement is stored together with the time at measurement into a memory. Based on the measurement time, that is, the time corresponding to the compensation error ε, and the stored thermal displacement amount change state n (see Step SB10 of FIG. 5), moreover, the thermal displacement amount change state n at the time of occurrence of the determined compensation error ε is identified and stored into a memory.

In the case (2) where the compensation error ε in the direction of each axis is determined by measuring the predetermined position of the workpiece which was machined with the thermal displacement Ld compensated, on the other hand, the compensation error ε obtained from the result of the measurement is stored together with the time at machining of the workpiece into a memory. Based on the time at machining of the workpiece, that is, the time corresponding to the compensation error ε, and the stored thermal displacement amount change state n (see Step SB10 of FIG. 5), moreover, the thermal displacement amount change state n at the time of occurrence of the determined compensation error ε is identified and stored into a memory. The "predetermined position of the machined workpiece" to be measured may be different from the position of a region being currently machined and can be used in evaluating the thermal displacement during the machining of the region concerned.

<Calculation of Coefficient En>

The thermal displacement compensation amount δ at the "time corresponding to the compensation error ε" is determined. The time when the thermal displacement compensation amount δ is calculated is read from the memory (see Step SC05 of FIG. 6). If the read time is coincident with the "time corresponding to the compensation error ϵ", the thermal displacement compensation amount δ corresponding to the read time is read. If there is no read time coincident with the "time corresponding to the compensation error ϵ", in contrast, times just before and after the "time corresponding to the compensation error ϵ" are read, and thermal displacement compensation amount δ corresponding to each of these times is read. Thus, on the assumption that the thermal displacement compensation amount δ linearly changes between the times, the thermal displacement compensation amount δ at the time corresponding to the compensation error ϵ is calculated. This amount is determined for each axis.

The coefficient En is updated according to the following equation, based on the ratio (ϵ/δ) of the compensation error ϵ to the thermal displacement compensation amount δ at the "time corresponding to the compensation error ϵ" and the thermal displacement amount change state n at the time of occurrence of the compensation error ϵ:

$$En' = En \times \{1 + (\epsilon/\delta)\}.$$

This updated coefficient En' is determined for each axis. Further, the ratio between coefficients before update and after update is stored for each coefficient into a memory. The coefficient after update is stored as a new coefficient (En=En') into a memory. Thus, the new coefficient is reflected in the next and subsequent calculations of the thermal displacement compensation amount. Here n, which represents the thermal displacement amount change state, is assigned so that n=1, n=2, and n=3 indicate the heat generating state, steady state, and heat dissipating state, respectively. An initial value of the coefficient En is previously stored in a memory, corresponding to each thermal displacement amount change state n.

Processing for the calculation and compensation of the thermal displacement amount will be described with reference to the flowchart of FIG. 4. The following is a sequential description of various steps of operation.

[Step SA01] The thermal displacement amount D is calculated.

[Step SA02] It is determined whether or not the first predetermined time has elapsed. If the lapse of the first predetermined time is ascertained, the program proceeds to Step SA03. If not, the program proceeds to Step SA4. The first predetermined time may be set arbitrarily.

[Step SA03] The thermal displacement amount change state n is identified. [Step SA04] The thermal displacement compensation amount δ is calculated.

[Step SA05] The thermal displacement Ld is compensated, whereupon this processing ends.

In Step SA01 described above, processing for "calculating a thermal displacement amount which is produced by heat generation or dissipation as the machine tool is actuated or stopped" is performed. Thus, Step SA01 corresponds to processing by a "thermal displacement amount calculation unit" that constitutes a thermal displacement compensating device for a machine tool according to the present invention. In Step SA03, moreover, processing for "determining a variation between a thermal displacement amount calculated last time and a current thermal displacement amount for each first predetermined time by means of the thermal displacement amount calculation unit (Step SA01) and identifying a plurality of thermal displacement amount change states based on comparison between the determined variation and the predetermined threshold" is performed. Thus, Step SA03 corresponds to processing by a "thermal displacement state identification unit" that constitutes the thermal displacement compensating device according to the present invention. In Step SA04, furthermore, processing for "calculating a thermal displacement compensation amount by multiplying the thermal displacement amount calculated by the thermal displacement amount calculation unit (Step SA03) by a coefficient" is performed. In Step SA05, moreover, processing for "compensating the position command for a feed shaft by adding the thermal displacement compensation amount to the position command" is performed. Thus, Steps SA04 and SA05 correspond to the processing by a "thermal displacement compensation amount calculation unit" and a "position command compensation unit", respectively, which constitute the thermal displacement compensating device according to the present invention.

Identification processing for the thermal displacement amount change state will be described with reference to the flowchart of FIG. 5. In this processing, the thermal displacement amount change state is identified, based on the thermal displacement amount for each axis calculated for each predetermined time and the time at calculation of the thermal displacement amount, in accordance with the processing of the flowchart of FIG. 4. The following is a sequential description of various steps of operation.

[Step SB01] A thermal displacement amount $D_0$ for each axis calculated last time is read from the memory. [Step SB02] The thermal displacement amount D for each axis calculated this time is read from the memory.

[Step SB03] The difference ($\Delta D = D - D_0$) between the thermal displacement amount D for each axis calculated this time and the thermal displacement amount $D_0$ for each axis calculated last time is calculated.

[Step SB04] It is determined whether the difference ΔD between the thermal displacement amounts for each axis calculated in Step SB03 is equal to or smaller than a predetermined first threshold ThrA. If the difference ΔD is equal to or smaller than the predetermined first threshold, the program proceeds to Step SB05. If not, the program proceeds to Step SB06.

[Step SB05] It is determined that the thermal displacement amount change state is the steady state.

[Step SB06] It is determined whether or not the difference ΔD between the thermal displacement amounts for each axis is greater than 0. If the difference is greater than 0, the program proceeds to Step SB07. If not, the program proceeds to Step SB08.

[Step SB07] It is determined that the thermal displacement amount change state is the heat generating state.

[Step SB08] It is determined that the thermal displacement amount change state is the heat dissipating state.

[Step SB09] The thermal displacement amount $D_0$ for each axis calculated last time is replaced with the thermal displacement amount D for each axis calculated this time.

[Step SB10] The thermal displacement amount for each axis, the time at calculation of the thermal displacement amount, and the thermal displacement amount change state are stored into the memory, whereupon this processing ends.

The following is a supplementary explanation of the flowchart of FIG. 5.

The variation ΔD of the thermal displacement amount for each axis is calculated in Step SB03. Alternatively, however, the variation of the thermal displacement amount for any one of the axes may be calculated instead of calculating those for all the axes so that it can be used in common for all the axes.

The thermal displacement amount change state is identified as one of three alternatives, the steady state (Step SB05), heat generating state (Step SB07), and heat dissipating state (Step SB08). However, a plurality of thresholds may be provided for more alternatives for the thermal displacement amount change state to be identified. For example, two thresholds may be provided for two alternatives for each of the heat generating and dissipating states.

First, a first threshold ThrA and a second threshold ThrB which is greater than the first threshold ThrA are provided. The first threshold ThrA is used to identify the thermal displacement amount change state among the three alternatives, the heat generating state, steady state, and heat dissipating state. Further, the second threshold ThrB is used to classify the heat generating state into two modes, a heat generating state AA for the case where the variation of the thermal displacement amount is greater than the first threshold ThrA and not greater than the second threshold ThrB and a heat generating state BB for the case where the variation of the thermal displacement amount is greater than the second threshold ThrB and the thermal displacement amount is increased. The heat dissipating state can also be classified into two modes in a similar way.

Processing for thermal displacement compensation amount calculation will be described with reference to the flowchart of FIG. 6. In this processing, the thermal displacement amount D calculated by the processing of the flowchart of FIG. 4 is multiplied by the coefficient En corresponding to the thermal displacement amount change state n, and the amount to cancel out the resulting product is calculated as the thermal displacement compensation amount $\delta$ for each axis. The calculated thermal displacement compensation amount $\delta$ for each axis, along with the time at calculation and the thermal displacement amount change state n, is stored into the memory for each predetermined time. The following is a sequential description of various steps of operation.

[Step SC01] The current thermal displacement amount change state n is read from the memory.

[Step SC02] The coefficient En corresponding to the thermal displacement amount change state n is read from the memory.

[Step SC03] The thermal displacement amount D is multiplied by the coefficient En, and the amount to cancel out the resulting product is used as the thermal displacement compensation amount $\delta$.

[Step SC04] It is determined whether or not a second predetermined time has elapsed. If the lapse of the predetermined time is ascertained, the program proceeds to Step SC05. If not, this processing ends. The second predetermined time may be set arbitrarily.

[Step SC05] The thermal displacement compensation amount $\delta$, the time at the calculation, and the thermal displacement amount change state n are stored into the memory, whereupon this processing ends.

In Step SC05 described above, processing for "storing the thermal displacement amount calculated by the thermal displacement compensation amount calculation unit, time at calculation of the thermal displacement compensation amount, and the thermal displacement amount change state identified by the thermal displacement state identification unit into a memory for each second predetermined time" is performed. Thus, Step SC05 corresponds to a "thermal displacement compensation amount history unit" that constitutes the thermal displacement compensating device according to the present invention.

Processing for calculating the coefficient En corresponding to the thermal displacement amount change state will now be described with reference the flowchart of FIG. 7. The following is a sequential description of various steps of operation.

[Step SD01] The compensation error $\epsilon$ is determined and stored into the memory.

[Step SD02] The time corresponding to the compensation error $\epsilon$ and the thermal displacement amount change state n are stored into the memory.

[Step SC03] The thermal displacement compensation amount $\delta$ at the time corresponding to the compensation error $\epsilon$ is determined.

[Step SD04] The coefficient En is updated based on the thermal displacement compensation amount $\delta$, compensation error $\epsilon$, and thermal displacement amount change state n.

[Step SD05] The ratio (En'/En) between the coefficient En before update and the coefficient En' after update is stored into the memory.

[Step SD06] The coefficient after update is stored as a new coefficient (En=En') into the memory.

In Step SD04 described above, processing for "calculating the coefficient based on the thermal displacement amount change state identified by the thermal displacement state identification unit" is performed. Thus, Step SD04 corresponds to a "coefficient calculation unit" that constitutes the thermal displacement compensating device according to the present invention.

Figure 8:
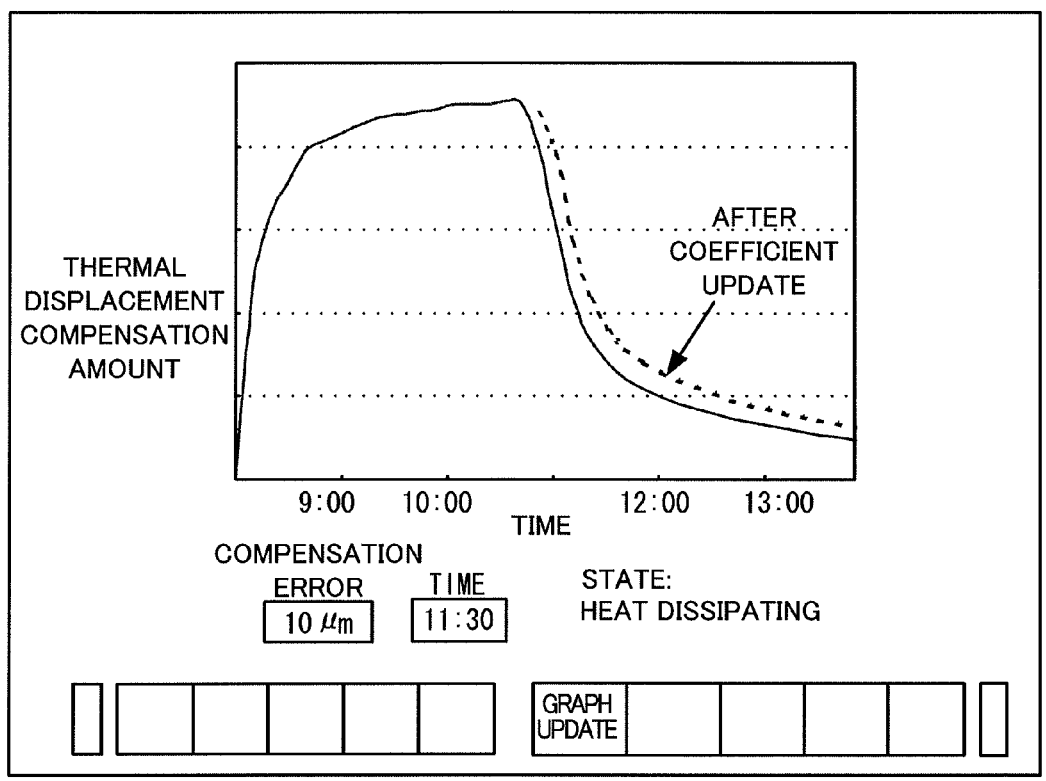
FIG. 8 is a diagram illustrating display of temporal variation in the thermal displacement compensation amount and display of prediction after coefficient update.

FIG. 8 is a diagram illustrating display of temporal variation in the thermal displacement compensation amount and display of prediction after the coefficient update. As shown in FIG. 8, temporal variations in the thermal displacement compensation amount before and after the coefficient update and touch switches for input indication of graph update and the like are displayed on the display screen of the LCD/MDI unit 70.

In the processing (thermal displacement compensation amount history unit) of Step SC05 in the flowchart of FIG. 6, the temporal variation in the thermal displacement compensation amount is graphically displayed on the screen of the machine tool (thermal displacement amount time variation display unit), based on the thermal displacement compensation amount stored in the memory and the time at calculation of the thermal displacement compensation amount. Further, a predicted thermal displacement compensation amount calculated by applying a coefficient determined by the processing (coefficient calculation unit) of Step SD04 to the thermal displacement compensation amount stored in the memory may also be graphically displayed on the screen (predicted thermal displacement compensation amount display unit).

The following is a description of graph display of the thermal displacement compensation amount.

<1> Display of Temporal Variation in Thermal Displacement Compensation Amount:

The thermal displacement compensation amount $\delta$ for each axis stored in the memory is read from the memory and displayed as a graph of a time-based thermal displacement compensation amount $\delta$ on the screen (display of temporal variation in thermal displacement compensation amount). Further, it is advisable to display the heat generating state, steady state, and heat dissipating state using varied colors or line types such that they can be visually identified.

<2> Predictive Display of Thermal Displacement Compensation Amount After Coefficient Update:

When the coefficient En is updated for the display of the temporal variation in the thermal displacement compensation amount $\delta$, the ratio (En'/En) between the unupdated and updated coefficients determined for each thermal displacement amount change state n for each axis is multiplied by the thermal displacement compensation amount $\delta$. By doing this, a predicted value of the thermal displacement compensation amount after the update of the coefficient En is determined, and the predicted thermal displacement compensation amount is superposed on the display of the temporal variation in the thermal displacement compensation amount. Thus, the standard of the thermal displacement compensation amount after the coefficient update can be easily grasped.

If an error occurs in the thermal displacement compensation, as described above, the thermal displacement amount change state is identified, and the thermal displacement compensation amount can be adjusted according to the identified thermal displacement amount change state. Thus, more accurate compensation can be achieved in any change state.

Since the thermal displacement amount change state is identified without additionally using a sensor, moreover, no additional cost is required for sensor means. Thus, the precision of the thermal displacement compensation can be reliably increased at low cost without the necessity of protecting the sensor means against a coolant, chips, etc., to ensure reliability.

Since the temporal variation in the thermal displacement compensation amount and the predicted thermal displacement compensation amount based on the coefficient determined for each thermal displacement amount change state can be displayed on the screen of the machine tool, furthermore, the standard of the thermal displacement compensation amount after the coefficient update can be easily grasped.

The invention claimed is:

1. A thermal displacement compensating device for a machine tool, which comprises a thermal displacement amount calculation unit configured to calculate a thermal displacement amount which is produced by heat generation or dissipation as the machine tool is actuated or stopped and changes with time, a thermal displacement compensation amount calculation unit configured to calculate a thermal displacement compensation amount by multiplying the thermal displacement amount calculated by the thermal displacement amount calculation unit by a coefficient, and a position command compensation unit configured to compensate a position command for a feed shaft by adding the thermal displacement compensation amount to the position command, the thermal displacement compensating device further comprising:

a thermal displacement state identification unit configured to determine a variation between a thermal displacement amount calculated last time and a current thermal displacement amount for each first predetermined time by means of the thermal displacement amount calculation unit and identifying a plurality of thermal displacement amount change states based on comparison between the determined variation and a predetermined threshold; and a coefficient calculation unit configured to calculate the coefficient based on the thermal displacement amount change state identified by the thermal displacement state identification unit.

2. The thermal displacement compensating device for a machine tool according to claim 1, further comprising: a thermal displacement compensation amount history unit configured to store the thermal displacement compensation amount calculated by the thermal displacement compensation amount calculation unit, time at calculation of the thermal displacement compensation amount, and the thermal displacement amount change state identified by the thermal displacement state identification unit into a memory for each second predetermined time; a thermal displacement compensation amount time variation display unit configured to graphically display a temporal variation in the thermal displacement compensation amount on a screen of the machine tool, based on the thermal displacement compensation amount stored in the memory by the thermal displacement compensation amount history unit and the time at calculation of the thermal displacement compensation amount; and a predicted thermal displacement compensation amount display unit configured to display a predicted thermal displacement compensation amount, which is calculated by applying a coefficient determined by the coefficient calculation unit to the thermal displacement compensation amount stored in the memory, on a graph displayed by the thermal displacement compensation amount time variation display unit.

* * * * *